(12) United States Patent
Reisch et al.

(10) Patent No.: US 11,603,907 B2
(45) Date of Patent: Mar. 14, 2023

(54) GEARWHEEL TRANSMISSION

(71) Applicant: ZF Friedrichshafen AG, Friedrichshafen (DE)

(72) Inventors: Matthias Reisch, Ravensburg (DE); Christoph Erkens, Eschweiler (DE); Eckhardt Lübke, Friedrichshafen (DE); Martin Rattay, Ravensburg (DE); Marc Seeberger, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/954,820

(22) PCT Filed: Nov. 16, 2018

(86) PCT No.: PCT/EP2018/081607
§ 371 (c)(1),
(2) Date: Jun. 17, 2020

(87) PCT Pub. No.: WO2019/120798
PCT Pub. Date: Jun. 27, 2019

(65) Prior Publication Data
US 2021/0095742 A1    Apr. 1, 2021

(30) Foreign Application Priority Data
Dec. 18, 2017    (DE) .................... 10 2017 223 018.5

(51) Int. Cl.
*F16H 1/08* (2006.01)
*F16H 55/17* (2006.01)

(52) U.S. Cl.
CPC ............... *F16H 1/08* (2013.01); *F16H 55/17* (2013.01)

(58) Field of Classification Search
CPC ...... F16H 57/02004; F16H 1/08; F16H 3/095; F16H 55/17
See application file for complete search history.

(56) References Cited

U.S. PATENT DOCUMENTS

| | | | | |
|---|---|---|---|---|
| 1,548,545 A | * | 8/1925 | Niederhauser .... | F16H 57/02004 74/466 |
| 3,149,499 A | * | 9/1964 | Schmitter ................ | F16H 1/22 74/409 |
| 3,206,993 A | * | 9/1965 | Niemann .................. | F16H 1/06 74/410 |
| 4,369,668 A | * | 1/1983 | Pollak-Banda ....... | F04D 29/051 74/410 |

(Continued)

FOREIGN PATENT DOCUMENTS

CN    1162986 A    10/1997
CN    102192305 A    9/2011
(Continued)

OTHER PUBLICATIONS

International Search Report (English Translation) PCT/EP2018/081607, dated Jan. 22, 2019. (2 pages).
(Continued)

*Primary Examiner* — Gregory Robert Weber
(74) *Attorney, Agent, or Firm* — Dority & Manning, P.A.

(57) ABSTRACT

A gear transmission includes a first helical-cut gearwheel (1) and a second helical-cut gearwheel (2) engaged for transmitting torques in different directions. The first gearwheel (1) and the second gearwheel (2) each include corresponding ring-shaped thrust collars (4, 5), and corresponding thrust collars (4, 5) each form a race (8, 9, 10, 11) having an overlap region. A first race (8) and a second race (9) form an overlap region for traction torques, and a third race (10) and a fourth race (11) form an overlap region for overrun torques. Each overlap region includes a contact surface or a contact point (14, 15), and each contact point (14, 15) is situated on a contact circle diameter (16, 17). The contact surfaces or contact points (8, 9) for traction torques and the contact surfaces or contact points (10, 11) for overrun torques are radially offset.

17 Claims, 7 Drawing Sheets

(56) References Cited

U.S. PATENT DOCUMENTS

| | | | | |
|---|---|---|---|---|
| 4,617,839 A * | 10/1986 | Matoba | ..................... | F16H 1/28 |
| | | | | 475/335 |
| 4,674,360 A * | 6/1987 | Matoba | ............. | F16H 57/02004 |
| | | | | 475/331 |
| 5,871,415 A * | 2/1999 | Fuhrer | ............. | F16H 57/02004 |
| | | | | 475/346 |
| 6,334,369 B1 * | 1/2002 | Sandig | ..................... | F16H 1/08 |
| | | | | 74/413 |
| 8,813,599 B2 | 8/2014 | Miura | | |
| 2011/0030491 A1 * | 2/2011 | Leimann | ........... | F16H 57/02004 |
| | | | | 74/413 |
| 2018/0156319 A1 * | 6/2018 | Brusset | ................... | F16H 13/06 |

FOREIGN PATENT DOCUMENTS

| | | | |
|---|---|---|---|
| DE | 7917319 U1 * | 11/1980 | |
| DE | 7917319 U1 | 11/1980 | |
| DE | 3047334 A1 * | 7/1982 | ....... F16H 57/02004 |
| DE | 3047334 A1 | 7/1982 | |
| DE | 3047334 C2 | 7/1982 | |
| DE | 3707992 C2 | 8/1988 | |
| DE | 102014210686 A1 | 12/2015 | |
| EP | 0021223 B1 | 1/1981 | |
| EP | 1493947 A1 | 1/2005 | |
| GB | 196566 A | 10/1923 | |
| JP | H0640893 B2 * | 6/1994 | ......... B65D 83/0454 |
| JP | 2011121517 A | 6/2011 | |

OTHER PUBLICATIONS

German Search Report DE102017223018.5, dated Aug. 14, 2019. (14 pages).

Chinese Office Action 201880081171.8, dated Oct. 9, 2022. (10 pages).

* cited by examiner

GEARWHEEL TRANSMISSION

CROSS-REFERENCE TO RELATED APPLICATION

The present application is related and has right of priority to WO Publication No. 2019/120798 filed on Nov. 16, 2018 and to German Patent Application No. 10 2017 223 018.5 filed on Dec. 18, 2017, which are both incorporated by reference in their entirety for all purposes.

FIELD OF THE INVENTION

The invention relates generally to a gear transmission including a first helical-cut gearwheel and a second helical-cut gearwheel for transmitting torques in different directions, for example, for traction and overrun torques.

BACKGROUND

In present-day gear transmissions, for example, in the drive train for a motor vehicle, helical gears are primarily utilized, for acoustic reasons.

In the case of a helical gear, as compared to a spur gear, additional axial loads arise between the gearwheels, which must be supported. These forces are mostly introduced into the housing via the particular shaft bearing. Due to the additional mechanical outlay necessary therefor, disadvantages related to size and costs arise. Moreover, additional bearing losses arise, which adversely affect the efficiency.

In order to reduce this problem, there are approaches in which the axial loads are compensated for directly in the region of the gearwheels with the aid of corresponding contact surfaces on thrust collars.

DE 37 07 992 C2 describes a compact and cost-effective approach in which the thrust collar contact point is situated remotely from the pitch point. In this case, the contact point is arranged directly below the root diameter of a gearwheel. Due to the relatively high sliding speed in the contact point, this concept is disadvantageous in terms of efficiency. Nevertheless, this variant is the most common today.

EP 0 021 223 B1 describes an embodiment in which the thrust collar contact point is situated close to the pitch point. This approach is advantageous in terms of efficiency due to the low sliding speed in the contact point, but requires additional design complexity, since additional components such as a thrust collar and thrust elements are necessary.

In EP 1 493 947 A1, an attempt is made to combine the advantages of the two above-described approaches, in that the thrust collar runs next to the lateral gearwheel surfaces. The interrupted race that arises as a result has acoustic disadvantages, however, since oscillations are excited due to the moving force-introduction point.

SUMMARY OF THE INVENTION

Example aspects of the present invention resolve the aforementioned trade-off and provide a cost-effective, compact gear transmission having low design complexity, low losses in the efficiency, and no acoustic disadvantages, which is suitable, in particular, for driving with traction torque and for the application in a drive train of a motor vehicle, such as in a vehicle transmission.

Example aspects of the invention is based on the assumption that, in the case of a gear transmission, there is a preferred torque direction, in the case of which the efficiency is particularly important. With respect to motor vehicles, this is typically driving with traction, i.e, in the traction operation with traction torque. In this case, the driving time components are high and the important factors with respect to a motor vehicle are the fuel consumption as well as the efficiency and the noise.

If the sign of the torque is reversed, i.e., for example, during driving in the coasting condition, the driving time components are considerably less and the efficiency of the vehicle transmission and/or the motor vehicle is less important, since the driver is decelerating or is even in the braking mode anyway.

Example aspects of the invention, with respect to a gear transmission of the aforementioned type, arrange the contact surfaces or the contact points for traction torques and the contact surfaces or the contact points for overrun torques in a spatially separated manner, so that a first contact surface and a second contact surface or first contact points and second contact points are provided and that the first and second contact surfaces or the first and second contact points for traction torques and traction torques are arranged radially offset with respect to one another.

Therefore, a gear transmission including two thrust collars as well as two pair of races is advantageously provided. Due to the fact, in particular, that the first and second contact surfaces or contact points for traction and overrun torques are arranged radially offset with respect to one another, the properties of the contact surfaces or contact points are adapted, in the best way possible, to the demands for the particular driving operation with traction and overrun torques, i.e., for the driving operation in the preferred torque direction with traction torque, the thrust collars are optimized with respect to efficiency and, for the driving operation with overrun torque, are optimized with respect to costs.

One example refinement of the invention is particularly advantageous, which provides that the first contact surface or the first contact point in the efficiency-relevant torque direction for traction torques is arranged close to the pitch circle diameter. This yields a design that is favorable with respect to efficiency for the high driving time components in the traction operation, since the sliding speeds of the two contact surfaces or the contact points of the first and the second gearwheels are low.

The contact surface or the contact point can be described as being close to the pitch circle diameter when the contact surface or the contact point is situated remotely from the pitch circle diameter by less than two percent (2%) of the center distance of the two gearwheels involved.

Advantageously, the second contact surface or the second contact point in the subordinate torque direction for overrun torques are provided below the root diameter of one gearwheel. In the coasting condition, usually no high driving time components are to be anticipated, and so a cost-effective design therefor can be selected.

In one example refinement of the invention, it is provided to arrange the first contact surface or the first contact point for traction torques closer to the pitch circle diameter than the second contact surface or the second contact point for overrun torques. Therefore, advantageously, a differentiation possible for properties of the contact surfaces or contact points and, therefore of the thrust collars, that are different for traction and overrun torques is already to be provided.

One advantageous example refinement of the invention provides that corresponding races for traction and overrun torques are formed geometrically differently, such as cone-shaped/cone-shaped and/or cone-shaped/crowned.

In another example refinement of the invention, at least one first race is formed as one piece on the first gearwheel.

This is preferably the support in the coasting condition, since the efficiency is less important here, i.e., a separate thrust collar is not necessary. This is advantageous, since an additional component is not necessary in this case.

In one example refinement of the invention, at least one second race is provided on a separate component, in particular on a thrust collar, on the first gearwheel. Therefore, advantageously, the geometry of the second race can be selected independently of the first race.

It is self-explanatory that, on the second gearwheel as well, the first race can be designed as one piece with the gearwheel and the second race can likewise be designed as a separate component, as described above, advantageously, with respect to the first gearwheel.

In one advantageous example refinement of the gear transmission according to the invention, a thrust collar is designed including a first race and/or a second race for traction and overrun torques. Therefore, a separation of the two races as well as a simple manufacture of the two races on one component, namely a thrust collar, is made possible.

Advantageously, it is provided that the geometry of the contact surface at least approximately corresponds to the lateral surface of a truncated cone. This is a surface that can be easily and cost-effectively manufactured.

In one further example embodiment of the gear transmission, it is provided that a crowning is superimposed on the conical shape of at least one of two mutually associated races in each case. As a result, it is advantageously achieved that the contact pattern in the contact surface is favorable even in the case of an incorrect angular position of the thrust collar axes with respect to one another, for example, caused by shaft deflection and, therefore, elevated contact pressures in the edge region do not occur.

In another example refinement of the invention, the contact circle diameter of the driving gear is designed to be greater than the pitch circle diameter. As a result, in the contact point on the contact circle diameter, the load is transmitted in the same direction as in the toothing and, therefore, reactive power is advantageously avoided.

In one advantageous example refinement of the invention, a component adjacent to the first gearwheel or the second gearwheel is designed as a thrust collar. The race of a thrust collar can be recessed, for example, directly into a shaft or an adjacent gearwheel, whereby, advantageously, a thrust collar, as a separate component, can be saved.

In another example refinement of the invention, it is provided that the thrust collar is designed separately and is joined to the gearwheel via welding or staking or with the aid of a press fit. The thrust collar can be advantageously connected to the gearwheel in a force-locking, form-locking, or integrally bonded manner.

In one alternative example refinement of the invention, it is provided that the toothing is designed as a separate toothed ring, which is secured on a component, for example, is welded or staked or joined with the aid of a press fit or bonding, and the component advantageously comprises a thrust collar.

In one further example embodiment of the invention, it is provided that one of the two gearwheels is designed as an engageable idler gear and does not include a separate axial bearing, since the idler gear advantageously includes a thrust collar for compensating for the axial load.

In one particularly advantageous example refinement, it is provided to utilize the gear transmission according to the invention in a drive train, for example, for a motor vehicle. As a result, the aforementioned advantages are essentially simultaneously implemented in a vehicle transmission, namely a good efficiency in the traction operation, low manufacturing costs, a compact design, and a configuration of the thrust collars that has been optimized for efficiency, regardless of the addendum modification of the gearwheels, so that the gearwheels themselves can be optimally configured. In addition, advantageously, a gear transmission is provided, which essentially has no acoustic disadvantages.

Moreover, one example advantage of the invention is that of implementing the function with the aid of few components by utilizing a few parts multiple times.

For a better understanding of example aspects of the invention, in particular of the description and the claims, the essential technical terms utilized in the patent application are defined in the following, as follows:

The "pitch point" of two gearwheels of a gear transmission is the theoretically ascertainable point at which the speed vectors of the two gearwheels are identical. (From a spatial perspective, this is a straight line along the longitudinal extension of the corresponding teeth and in parallel to the axis of rotation of the gearwheels.)

"Thrust collar" refers to the component that includes the race.

The "race" on a thrust collar contains all possible contact surfaces in the course of the turning motion.

The "contact surface" is the surface on a thrust collar, at which corresponding gearwheels mutually support the axial load.

The "thrust collar contact point" is the central point of a contact surface. Generally, the face end of a race (as viewed in the radial cut) is designed to be cone-shaped and the corresponding race is designed to be cone-shaped with a superimposed crowning. The point of contact (ideally, viewed in a rigid condition) is the thrust collar contact point. Since not every geometry combination in the point of contact defines a point (for example, cone-cone→line; plane-plane→surface), the "contact point", alternatively, is also referred to as the point of the "contact surface" having the greatest Hertzian contact stress.

BRIEF DESCRIPTION OF THE DRAWINGS

Further objectives, advantages, features, and possible applications of the present invention result from the following description of several exemplary embodiments with reference to the drawings.

Wherein.

DETAILED DESCRIPTION

Figure 1:
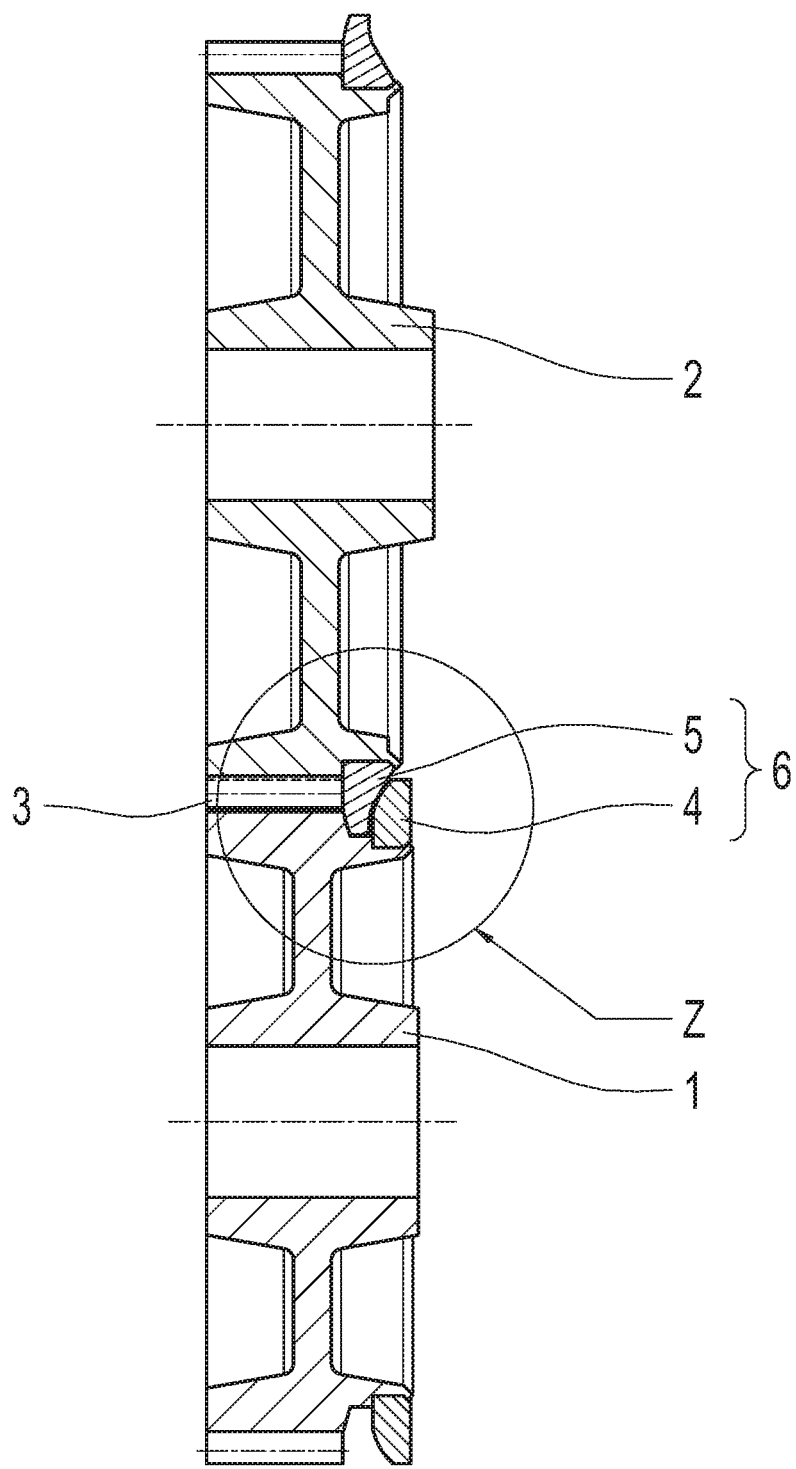
FIG. 1 shows a sectioning of a first gear pair according to example aspects of the invention, including a first thrust collar and a second thrust collar.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows one possible first example embodiment of the invention with respect to a gear pair including a first helical-cut gearwheel (1) and a second helical-cut gearwheel (2), which are engaged with each other via a meshing toothing (3) for transmitting torque. The first gearwheel (1) is provided with a separate ring-shaped first thrust collar (4) and the second gearwheel (2) is provided with a separate ring-shaped second thrust collar (5), which form a corresponding thrust collar pair (6).

Figure 2:
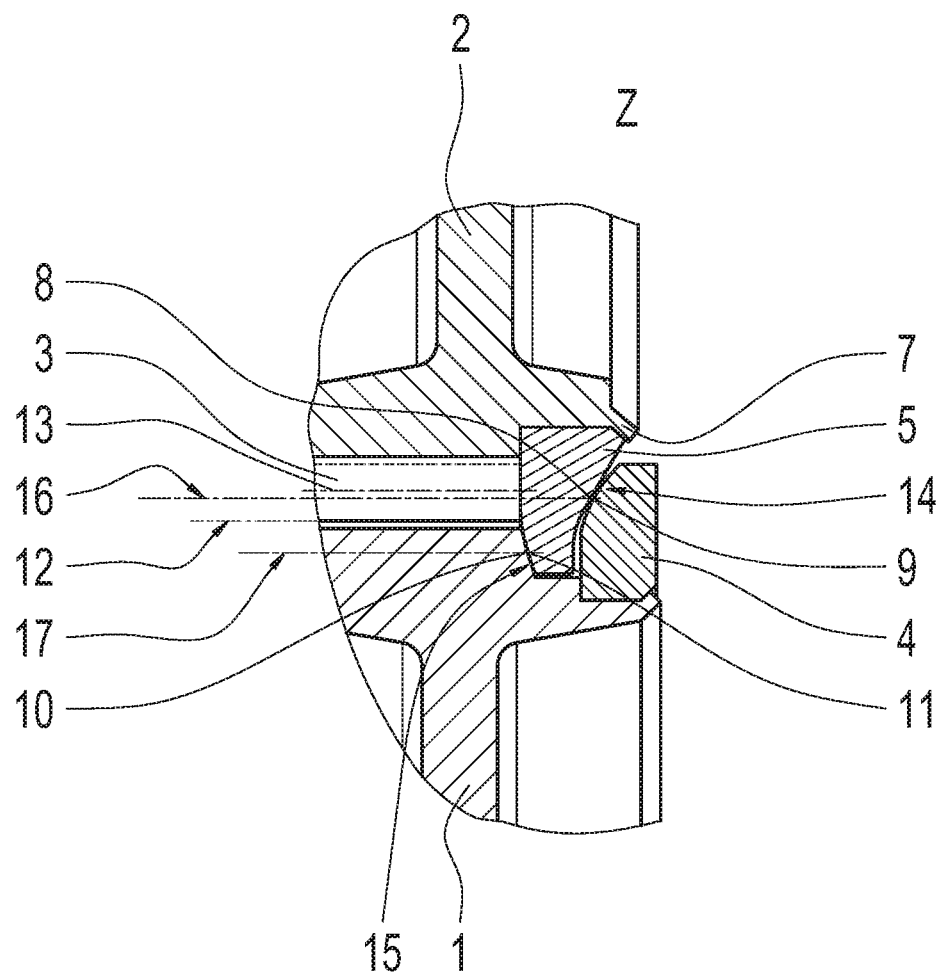
FIG. 2 shows an enlarged representation of a first thrust collar and a second thrust collar according to the detail "Z" in FIG. 1.

The ring-shaped second thrust collar (5) is centered on the second gearwheel (2) and is axially secured with the aid of staking (7) (FIG. 2). The first thrust collar (4) is also centered on the first gearwheel (1) and secured with the aid of staking. It is known to a person skilled in the art that there are other shaping processes besides staking for producing a form-locking retention against axial displacement.

The thrust collars (4, 5) include ring-shaped races (8, 9; 10, 11). The first race (8) and the second race (9) form, at their point of contact, a first contact point (14) on a first contact circle diameter (16), which is located close to the pitch circle diameter (13) of the toothing (3). As a result, only low sliding speeds arise between the first thrust collar (4) and the second thrust collar (5) and a good efficiency is obtained. For this reason, the helix direction of the meshing toothing (3) is selected in such a way that this thrust collar pair comes into play in the preferred torque direction, namely during traction. Therefore, the first race (8) and the second race (9) are provided for supporting the axial loads during traction torque and the third race (10) and the fourth race (11) are provided for supporting the axial loads during overrun torque.

The first gearwheel (1) includes a third race (10), which is introduced directly into the body of the gearwheel (1) and which, together with a fourth race (11), forms a second contact point (15) on the inner side of the thrust collar (5); the second contact point (15) is located on a second contact circle diameter (17) below the root diameter (12), i.e., on a diameter smaller than the root diameter (12).

Two races, namely the first race (8) and the third race (10), are designed to be cone-shaped. The respectively corresponding second race (9) and the fourth race (11) are designed to be cone-shaped with a superimposed crowning.

The first race (8) and the second race (9) form a first contact point (14) close to the pitch point on the pitch circle diameter (13). As a result, only low sliding speeds arise between the touching races (8, 9) and a good efficiency is obtained. For this reason, the helix direction of the toothing (3) is selected in such a way that this race pair of the first race (8) and the second race (9) comes into play in the preferred torque direction, wherein, in the present example, the preferred torque direction corresponds to the traction torque.

Therefore, when the torque is reversed, such as during an overrun torque, the third race (10) and the fourth race (11) come into play. Since this second contact point (15) has a greater distance to the pitch point or the pitch circle diameter (13), the sliding speed is higher here and, therefore, the efficiency is poorer. Therefore, these third and fourth races (10, 11) are utilized for the subordinate torque direction, namely, in this case, coasting, decelerating, etc.

Figure 3:
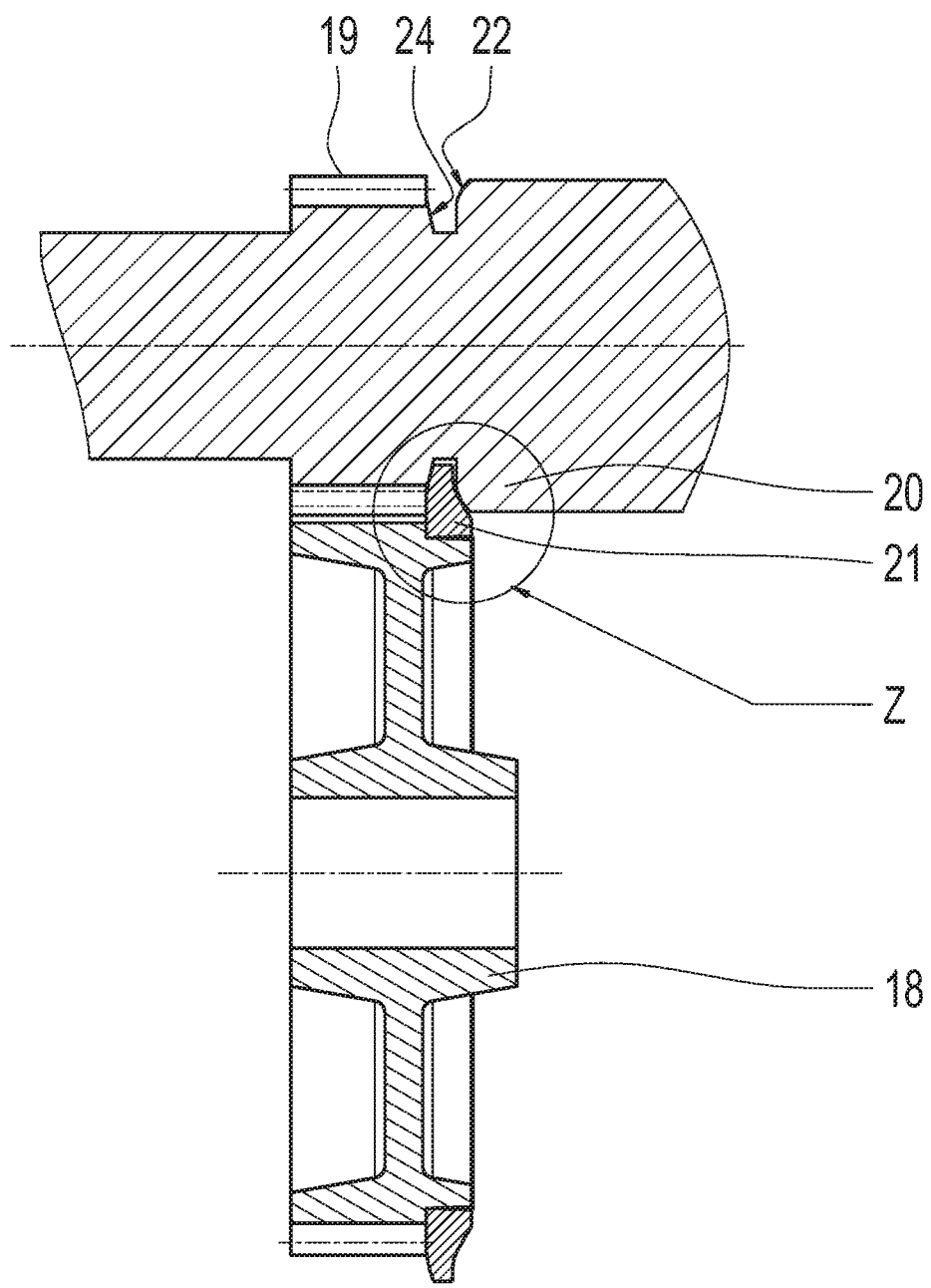
FIG. 3 shows a longitudinal section of a second gear pair according to example aspects of the invention, comprising only one separate thrust collar.

The active principle of the exemplary embodiment in FIG. 3 is similar to the approach in FIG. 1, although with a structurally simplified design. A third gearwheel (18) is engaged with a fourth gearwheel (19), which is introduced, as one piece, directly into a shaft (20). The third gearwheel (18) is provided with a separate third thrust collar (21), which is, for example, welded to the associated gearwheel (18).

In order to save one further separate thrust collar, however, a fifth race (22) is introduced directly into the shaft (20). At this point, any other adjacent component (for example, a gearwheel) can also be utilized as a receptacle for the race.

Figure 4:
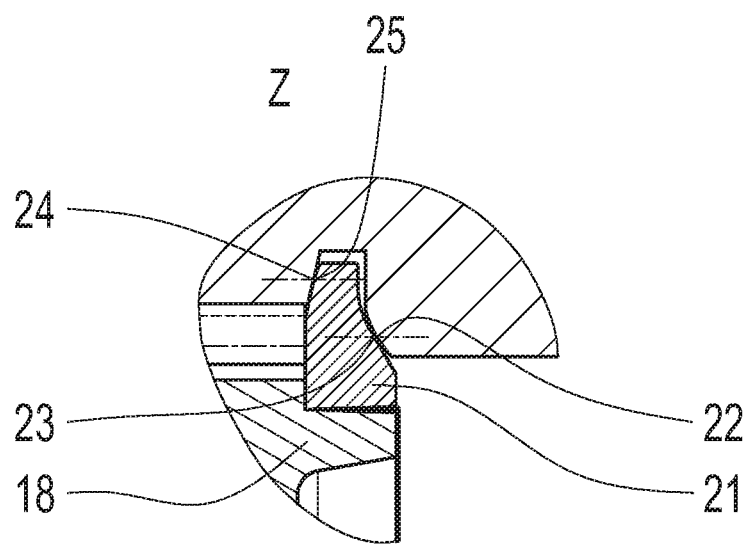
FIG. 4 shows an enlarged representation of a thrust collar including corresponding races according to the detail "Z" in FIG. 3.

The third thrust collar (21) (FIG. 4) is designed similarly to the representation of the second gearwheel (2) and of the third thrust collar (5) in FIGS. 1 and 2 and is mounted onto the third gearwheel (18). The third thrust collar (21) includes a sixth race (23), which cooperates with the fifth race (22) in the shaft (20). Moreover, the third thrust collar (21) contains an eighth race (25), which cooperates with a seventh race (24). The seventh race (24) is introduced directly and as one piece into the shaft (20), as is also the case for the fifth race (22). As a result, a further separate thrust collar is advantageously saved.

Figure 5:
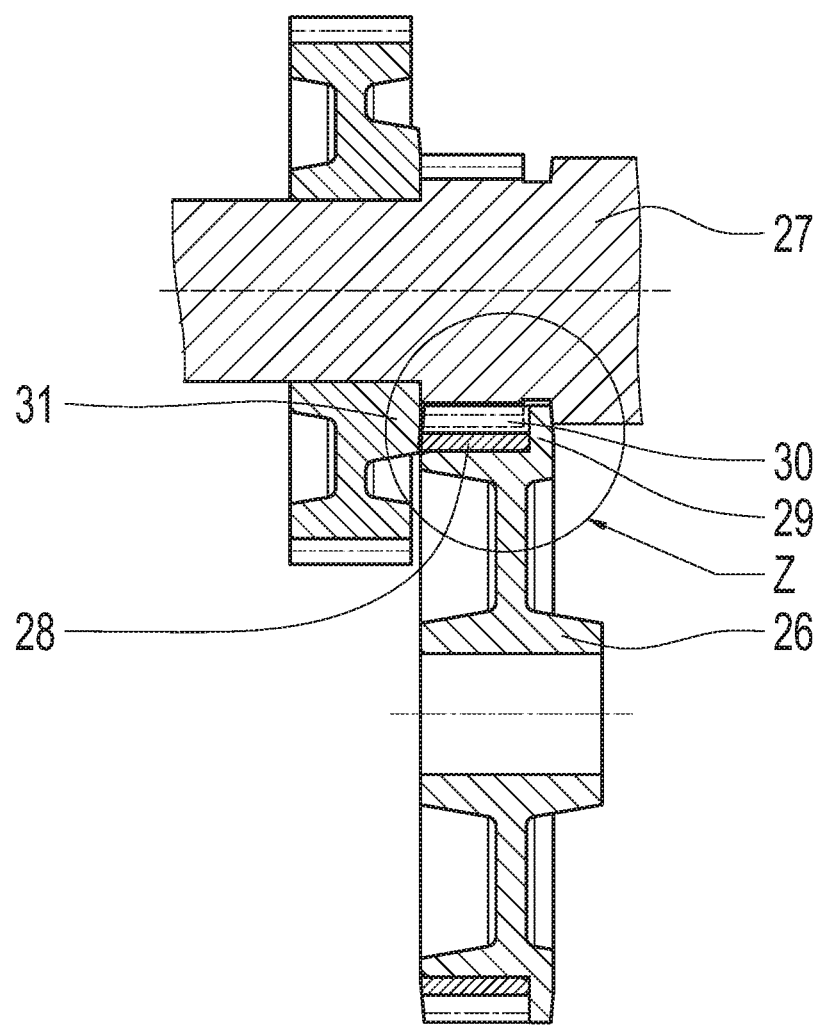
FIG. 5 shows a longitudinal section of a third gear pair according to example aspects of the invention, comprising a thrust collar on the hub.
Figure 6:
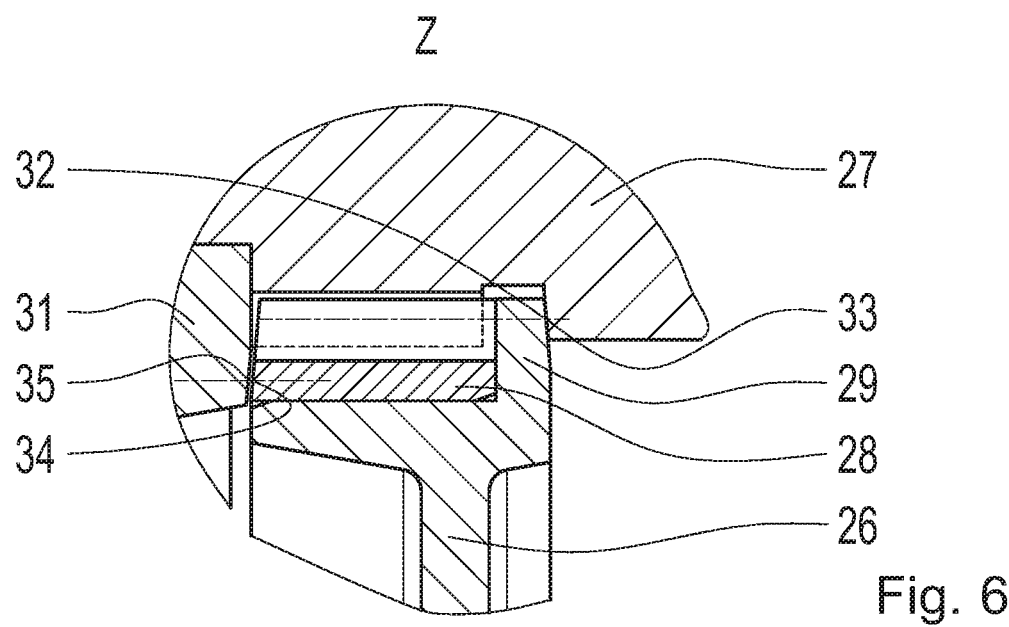
FIG. 6 shows an enlarged representation of a thrust collar on the hub according to the detail "Z" in FIG. 5.

The two contact points do not necessarily need to be situated on one side of the meshing toothing, as is the case for the preceding images in FIGS. 1 through 4. The contact points of the races in the next exemplary embodiment (FIGS. 5 and 6) are located on both sides of the meshing toothing.

In the following exemplary embodiment, on the one hand, a gear ring (28) is mounted onto a hub (26). In order to transmit torque between the gear ring and the hub, in particular, welding, a driving toothing, or a press fit are advantageous in this case. A ring-shaped, circumferential collar on the hub (26) is utilized as a stop during the mounting of the gear ring (28) as well as for forming a fourth thrust collar (29), which is therefore formed as one piece with the hub.

On the other hand, a meshing toothing (30) is introduced, as one piece, on the second shaft (27) and is connected to the gear ring (28) for transmitting torque. Directly adjacent to the meshing toothing (30), a further fifth gearwheel (31) is secured on the second shaft (27).

On the outer face end of the fourth thrust collar (29), a ninth race (32) is mounted, which cooperates with a tenth race (33), which is introduced directly and as one piece into the second shaft (27).

On the opposite side of the meshing toothing (30), an eleventh race (34) is mounted directly into the face end of the gear ring (28). This corresponds to a twelfth race (35) on the face end of the fifth gearwheel (31).

A particular feature of this example embodiment is that an adjacent fifth gearwheel (31) is utilized for implementing a twelfth race (35). A further feature is that the fourth thrust collar (29) is designed as one piece with the hub (26) and the gear ring (28) is joined thereon. As a result, advantageously, the design and mounting of separate thrust collars is avoided and the number of utilized components is reduced.

Figure 7:
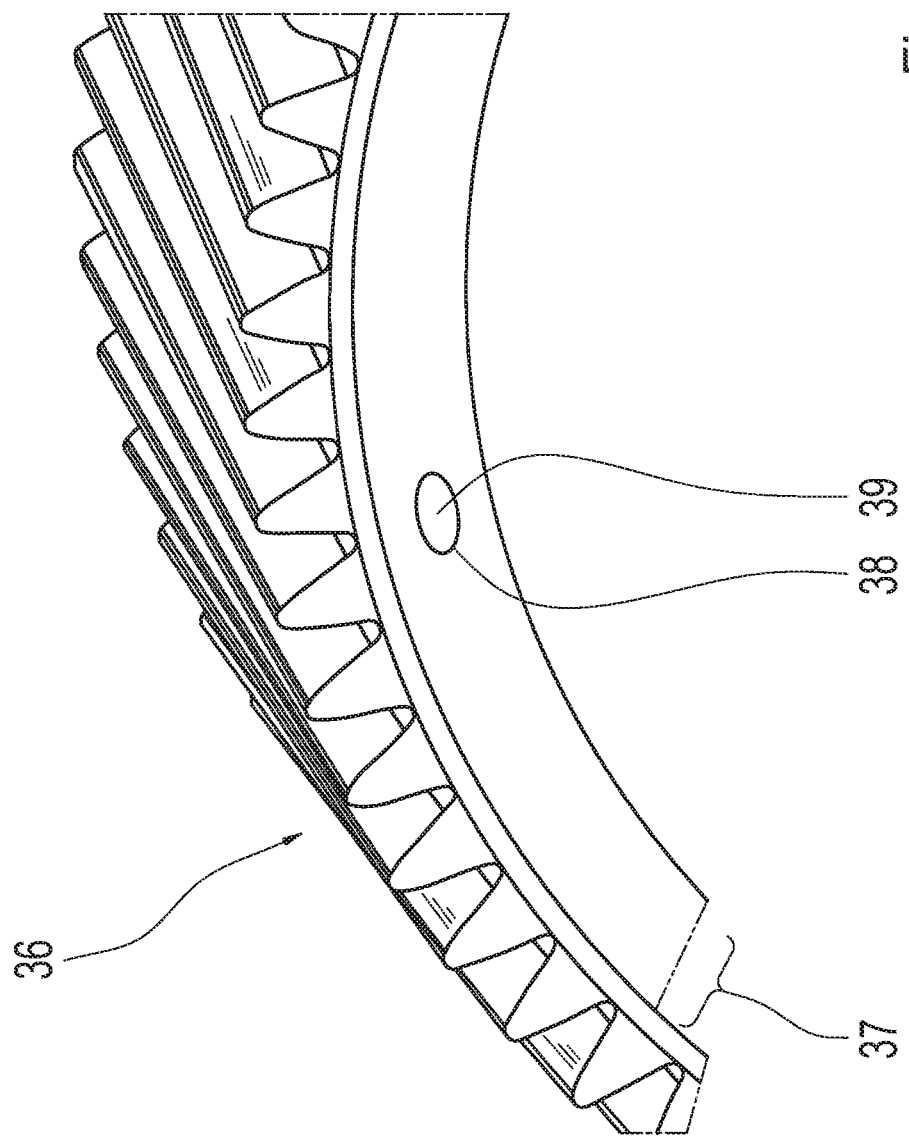
FIG. 7 shows a perspective view of a gearwheel segment including a race on the face end.

FIG. 7 shows the side view of a gearwheel segment (36) including an integrated, ring-shaped race (37) on the face end. At a contact surface (38), the axial load, generally the axial load from the oblique toothing, is directed to the corresponding gearwheel. Upon formation of a minimal contact between the race (37) and a corresponding race of a further gearwheel (not represented), the contact surface is reduced to a contact point (39).

Figure 8:
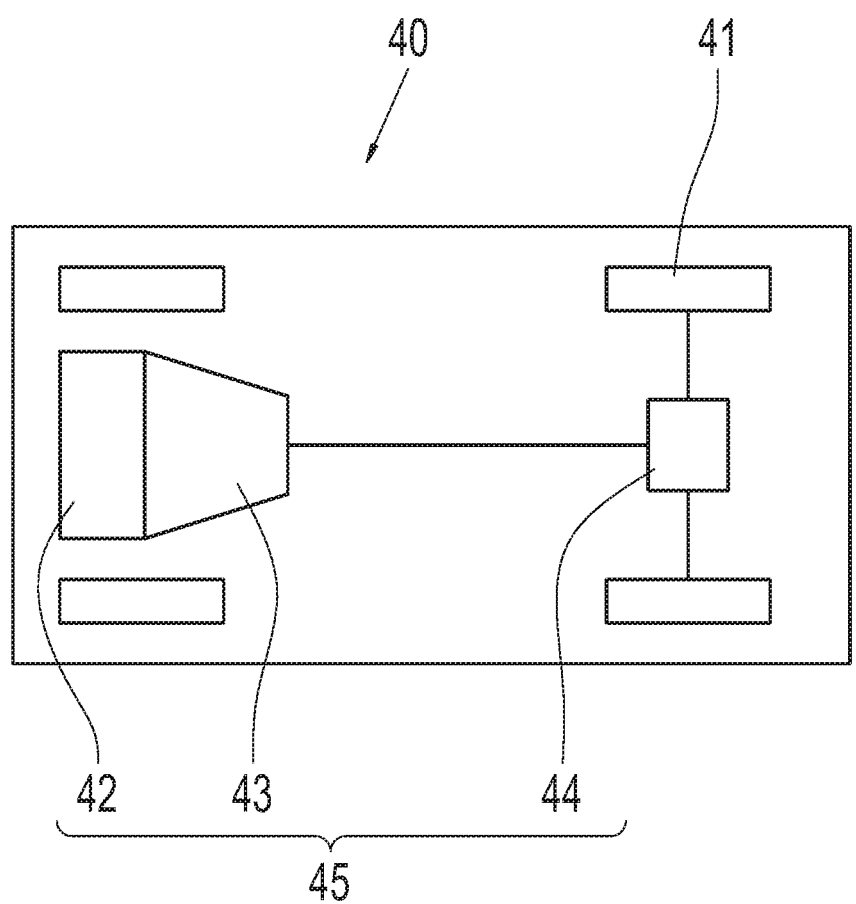
FIG. 8 shows a schematic of a motor vehicle including a drive train.

The application of a gear transmission according to example aspects of the invention in a drive train (45) for a motor vehicle (40) is represented in FIG. 8. An internal combustion engine (42) is directly connected to a vehicle transmission (43) and drives the wheels (41) of an axle via a differential (44). All components, namely the internal combustion engine (42), the vehicle transmission (43), the differential (44), and the wheels (41), form the drive train (45) of the motor vehicle (40).

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 first gearwheel
2 second gearwheel
3 oblique toothing/meshing toothing
4 first thrust collar
5 second thrust collar
6 thrust collar pair
7 staking
8 first race
9 second race
10 third race
11 fourth race
12 root diameter
13 pitch circle diameter
14 first contact point
15 second contact point
16 first contact circle diameter
17 second contact circle diameter
18 third gearwheel
19 fourth gearwheel
20 first shaft
21 third thrust collar
22 fifth race
23 sixth race
24 seventh race
25 eighth race
26 hub
27 second shaft
28 gear ring
29 fourth thrust collar (collar)
30 meshing toothing
31 fifth gearwheel
32 ninth race
33 tenth race
34 eleventh race
35 twelfth race
36 gearwheel segment
37 race, integrated
38 contact surface
39 contact point
41 motor vehicle
41 wheels
42 internal combustion engine
43 transmission
44 differential
45 drive train

The invention claimed is:

1. A gear transmission, comprising:
a first helical-cut gearwheel (1);
a second helical-cut gearwheel (2) engaged with the first helical-cut gearwheel (1) for transmitting torques in different directions for traction and overrun torques,
wherein a driving gearwheel and a driven gearwheel are definable from the first and second gearwheels (1, 2),
wherein toothings (3) of the first gearwheel (1) and the second gearwheel (2) each comprise a corresponding root diameter (12) and a corresponding pitch circle diameter (13),
wherein the first gearwheel (1) and the second gearwheel (2) each comprise a single corresponding ring-shaped thrust collar (4, 5) such that the first gearwheel (1) and the second gearwheel (2) collectively comprise only two thrust collars (4, 5) for supporting axial loads in opposite directions resulting from the traction and overrun torques,
wherein the thrust collars (4, 5) of the first and second gearwheels (1, 2) each form a race (8, 9; 10, 11) such that a first race (8) and a second race (9) form an overlap region for the traction torques and a third race (10) and a fourth race (11) form an overlap region for the overrun torques,
wherein each of the overlap regions for the traction and overrun torques comprises a respective contact surface or a respective contact point (14, 15) situated on a contact circle diameter (16, 17), and
wherein the contact surfaces or contact points (14) in the overlap region for traction torques and the contact surfaces or contact points (15) in the overlap region for overrun torques are radially offset, and
wherein the first race (8) only contacts the second race (9) at the contact surfaces or contact points (14) in the overlap region for traction torques, and the third race (10) only contacts the fourth race (11) at the contact surfaces or contact points (15) in the overlap region for overrun torques.

2. The gear transmission of claim 1, wherein the contact surface or the contact point (14) in the overlap region for traction torques is positioned proximate the pitch circle diameters (13) of the first and second gearwheels (1, 2), and the contact surface or the contact point (15) in the overlap region for overrun torques is positioned below one of the root diameters (12) of the first and second gearwheels (1, 2).

3. The gear transmission of claim 2, wherein the contact surface or the contact point (14) in the overlap region for traction torques is positioned proximate the pitch circle diameters (13) of the first and second gearwheels (1, 2) such that the contact surface or the contact point (14) in the overlap region for traction torques is spaced from the pitch circle diameters (13) of the first and second gearwheels (1, 2) by no greater than two percent of a center distance of the first and second gearwheels (1, 2).

4. The gear transmission of claim 1, wherein the contact surface or the contact point (14) in the overlap region for traction torques is positioned closer to the pitch circle diameters (13) than the contact surface or the contact point (15) in the overlap region for overrun torques.

5. The gear transmission of claim 1, wherein the first and second races (8, 9) forming the overlap region for the traction torques are shaped geometrically differently than the third and fourth races (10, 11) forming the overlap region for the overrun torques.

6. The gear transmission of claim 1, wherein the third race (10) is integrally formed on the first gearwheel (1).

7. The gear transmission of claim 6, wherein the second race (9) is formed on the thrust collar (4) of the first gearwheel (1).

8. The gear transmission of claim 1, wherein the thrust collars (4, 5) of the first and second gear wheels (1, 2) include the first race (8) and/or the second race (9).

9. The gear transmission of claim 1, wherein a geometry of the contact surface (38) at least approximately corresponds to a lateral surface of a truncated cone in one or both of the overlap regions for the traction and overrun torques.

10. The gear transmission of claim 9, wherein a crowning is superimposed on the truncated cone.

11. The gear transmission of claim 1, wherein the contact circle diameter (16, 17) of the contact surface or the contact point (14, 15) of the driving gearwheel is greater than the pitch circle diameter (13) of the driving gearwheel.

12. The gear transmission of claim 1, wherein:
a component (29) adjacent the first gearwheel forms the thrust collar of the first gearwheel; and/or
a component (31) adjacent the second gearwheel forms the thrust collar of the second gearwheel.

13. The gear transmission of claim 1, wherein:
the thrust collar (4) of the first gearwheel is joined to the first gearwheel (1) via welding, staking, or press fitting; and/or
the thrust collar (5) of the second gearwheel is joined to the second gearwheel (2) via welding, staking, or press fitting.

14. The gear transmission of claim 1, wherein the toothing (30) of one of the first and second gearwheels (1, 2) is a gear ring (28) and is secured on a component, and the component (26) comprises the thrust collar (29) of the one of the first and second gearwheels (1, 2).

15. The gear transmission of claim 1, wherein the component is a hub (26), and the gear ring (28) is welded, staked, press fit, or bonded to the hub (26).

16. The gear transmission of claim 1, wherein one of the first and second gearwheels (1, 2) is an engageable idler gear and does not comprise a separate axial bearing.

17. A drive train (45), comprising the gear transmission of claim 1.

* * * * *